United States Patent
Echizen et al.

(10) Patent No.: US 7,288,140 B2
(45) Date of Patent: Oct. 30, 2007

(54) WET PROCESS GAS TREATMENT APPARATUS

(75) Inventors: Hiroshi Echizen, Nara (JP); Hiroshi Izawa, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 424 days.

(21) Appl. No.: 10/959,966

(22) Filed: Oct. 8, 2004

(65) Prior Publication Data

US 2005/0081720 A1    Apr. 21, 2005

Related U.S. Application Data

(62) Division of application No. 10/321,482, filed on Dec. 18, 2002, now Pat. No. 6,821,317.

(30) Foreign Application Priority Data

Dec. 25, 2001 (JP) ............................. 2001-390924
Dec. 6, 2002  (JP) ............................. 2002-354560

(51) Int. Cl.
*B01D 47/06* (2006.01)
*B01D 53/14* (2006.01)

(52) U.S. Cl. ................... 96/290; 96/243; 96/277; 96/299; 95/199; 95/211; 95/224; 95/235; 261/98

(58) Field of Classification Search ........... 96/243, 96/270, 271, 273, 277, 280, 322, 290, 299; 95/199, 224, 225, 149, 235, 236, 210, 211; 261/98

See application file for complete search history.

(56) References Cited

U.S. PATENT DOCUMENTS

| | | | |
|---|---|---|---|
| 1,265,893 A | 5/1918 | Eustis | 95/211 |
| 2,596,692 A | 5/1952 | Jordan | 95/199 |
| 2,598,116 A | 5/1952 | DuBois | 95/199 |
| 2,805,734 A | 9/1957 | Riess et al. | 95/199 |
| 2,849,083 A | 8/1958 | Nelson et al. | 95/38 |

(Continued)

FOREIGN PATENT DOCUMENTS

JP    4-131121    5/1992

(Continued)

OTHER PUBLICATIONS

"Semiconductor Plant Environment Cleaning," compiled by Kazumasa Ono, Science Forum K.K. (Dec. 1980).

(Continued)

*Primary Examiner*—Jason M. Greene
(74) *Attorney, Agent, or Firm*—Fitzpatrick, Cella, Harper & Scinto

(57) ABSTRACT

In a wet-process gas treatment method of treating an acid gas by using at least two treating columns connected in series, a ratio of the concentration of an acid gas at an outlet to a concentration of the acid gas at an inlet of a first treating column is set higher than a ratio of the concentration of the acid gas at an outlet to the concentration of acid gas at an inlet of at least one of the other treating columns, thereby preventing deposits from forming in the interior of connecting pipes between the columns and in the interiors of the treating columns, to prevent the connecting pipes from being blocked.

2 Claims, 3 Drawing Sheets

U.S. PATENT DOCUMENTS

| | | | |
|---|---|---|---|
| 2,858,903 A | 11/1958 | Goetz et al. | 95/72 |
| 3,008,807 A | 11/1961 | Hilgert et al. | 96/275 |
| 3,404,512 A | 10/1968 | Tomany | 95/200 |
| 3,572,264 A | 3/1971 | Mercer | 110/215 |
| 4,023,938 A | 5/1977 | Guth et al. | 95/201 |
| 4,040,803 A | 8/1977 | Atsukawa et al. | 95/199 |
| 4,110,088 A * | 8/1978 | Cold et al. | 96/299 |
| 4,880,445 A * | 11/1989 | Watten | 96/290 |
| 4,948,402 A * | 8/1990 | Davis | 96/290 |
| 5,041,274 A | 8/1991 | Kagi, Sr. | 423/423.06 |
| RE35,234 E | 5/1996 | Davis | 55/233 |
| 5,753,012 A | 5/1998 | Firnhaber et al. | 95/65 |
| 5,756,058 A | 5/1998 | Watanabe et al. | 423/238 |
| 5,951,743 A | 9/1999 | Hsieh et al. | 95/224 |
| 6,551,382 B1 | 4/2003 | Richards | 95/66 |
| 2003/0070552 A1 * | 4/2003 | Lee et al. | 96/290 |

FOREIGN PATENT DOCUMENTS

| | | |
|---|---|---|
| JP | 9-186093 | 7/1997 |
| JP | 2000-202236 | 7/2000 |
| JP | 2000-334409 | 12/2000 |

OTHER PUBLICATIONS

"Theory and Calculation of Chemical Machines," compiled by Saburo Kamel, Sangyo Tosho, Chapter 6: Gas Absorption; Chapter 7: Absorption Problems, pp. 177-201, no date.

* cited by examiner

US 7,288,140 B2

WET PROCESS GAS TREATMENT APPARATUS

This application is a division of application Ser. No. 10/321,482, filed Dec. 18, 2002, which is incorporated herein by reference.

BACKGROUND OF THE INVENTION

1. Field of the Invention

This invention relates to a wet-process gas treatment method and a wet-process gas treatment apparatus by and with which acid gases are treated with an alkaline treating fluid. A preferred embodiment of the present invention relates to a treatment method using a multi-column structure having a plurality of packed columns connected in series. Also, the present invention is preferably applied to a method, and an apparatus, for treating deposits having formed when acid gases generated after the gas cleaning of polysilanes.

2. Related Background Art

Conventionally known as systems of wet-process scrubbers that can deal with a large air flow are a spray column, a packed column, a perforated-plate column and so forth. In these systems, waste gas is introduced from a column's lower part and a flow of waste gas is formed. Meanwhile, the treating fluid is made to fall from a column's upper part to form its flow, so that the flow of the waste gas and the flow of the treating fluid counter each other. Namely, in these systems, a treating fluid sprayed in a shower from the column's upper part and the waste gas are subjected to gas-liquid contact, or the waste gas is passed through a treating fluid layer on a perforated plate so as to be dispersed, to make them undergo gas-liquid contact (see "Semiconductor Plant Environment Cleaning", compiled by Kazumasa Ono, published by Science Forum K.K., published on Dec. 10, 1980).

The packed column has an internal structure as described below.

The column has a gas inlet at its lower part, and a grating (a wire mesh) is provided at a small upper part thereof. This grating frames a space in which the waste gas stays, and at the same time supports packings placed thereon. Then, the packings are layered on the grating, and a spray nozzle from which the treating fluid is sprayed is installed above the upper end of the packings. A column's upper-part outlet is further connected to a suction fan through a pipe. In some cases, a pressure fan is installed at the waste-gas inlet.

A description of how to design this packed column is provided in "Theory and Calculation of Chemical Machines" (compiled by Saburo Kamei, Sangyo Tosho) Chapter 6, Gas Absorption, Chapter 7, Absorption Problems, pp. 177-202. In this publication, an equation is provided according to which, when the gas has a higher mass velocity, the height of the packed column is decreased to increase the inner diameter of the column to lessen any pressure loss. Also, as an absorption problem, a method is disclosed by which the height of a packed column filled with packings and the column's internal diameter are calculated where the recovery (percentage) of waste gas and the type of packings are fixed.

U.S. Pat. No. Re. 35,234 discloses a case of a multi-column system in which a large number of packed columns of such a type are connected in series. Here, hydrogen sulfide in air is absorbed in a treating fluid to bring it to a desired concentration.

As a use of a wet-process scrubber for acid gases, an apparatus for treating waste gases generated when polysilanes are deposited as by-products in a CVD system is available. In this use, as a countermeasure for such deposition, the above publication discloses use of rotary nozzles as a substitute for usual spray nozzles. Also, in the following publications, techniques are disclosed such that deposits are mechanically scraped out, that a cleaning fluid is made to flow in a spiral form to dissolve deposits and that, in order to prevent blockage of an exhaust duct between a waste-gas treatment apparatus and a production apparatus, a nozzle for spraying a solvent is provided in the interior of the duct.

First, Japanese Patent Application Laid-Open No. 9-186093 discloses that a means for scraping out deposits left in a pipe and a means for exchanging a chemical fluid automatically is provided in order to prevent any blockage due to deposits having formed by the reaction of chloride waste gas with water (Case 1).

Second, Japanese Patent Application Laid-Open No. 4-131121 (Japanese Patent Publication No. 6-77669) discloses that an inlet for introducing untreated waste gases, including halogen-containing silicon compound gases and acid gases, such as hydrogen fluoride gas, or chlorine gas, is provided on a side portion of a jet scrubber, which sprays an alkali cleaning fluid in the form of a high-speed Jet from its ceiling, and the cleaning fluid is made to flow down in a spiral flow to this waste gas inlet to prevent blockage due to dust and highly viscous deposits (Case 2).

Third, Japanese Patent Application Laid-Open No. 2000-334409 discloses a means for preventing blockage of the above exhaust duct. In the case disclosed in this publication, the acid-alkali reaction takes place in the exhaust duct to which the waste gases coming from a plurality of production apparatus are gathered, to form reaction products (salts). In this publication, it is shown that a solvent is sprayed from a large number of nozzles and the reaction products are dissolved with the solvent so as to prevent the blockage (Case 3).

As countermeasures for blockage in the conventional wet-process scrubbers, available are, as stated above, scraping-out, chemical-fluid exchange, washing-away, drying prevention, spray nozzle rotating and so forth. However, there are no techniques which can fundamentally prevent deposition of by-products.

Especially where a large quantity of the acid gases to be treated are discharged, a large quantity of gel-like deposits may form in the vicinity of spray nozzles, on the back of spray nozzles, at perforated-plate ends and in the pipes downstream to the nozzles and perforated plates with respect to the flow of acid gas (hereinafter simply "the downstream side"). The interiors of the pipes on the downstream side tend to become blocked. Once the pipes are blocked, the apparatus must be stopped to disassemble the pipes to clean their interiors. Here, untreated acid gases may diffuse to cause air pollution and lead to an environmental problem. Also, since the acid gases are dangerous to human bodies, those who perform disassembly and cleaning must work wearing chemical protective suits and supplied-air respirators, under local evacuation. Namely, it is necessary to make sufficient considerations for safety.

Where the spray nozzles are rotated to prevent deposits from forming, the deposits may form at non-spray portions of the nozzles, so that the interiors of connecting pipes on the downstream side cannot avoid becoming blocked.

The occurrence of the above problems can be decreased if treating columns having a very large volume are used.

This, however, results in high cost of the apparatus and also results in large area for the place where the apparatus is installed.

SUMMARY OF THE INVENTION

An object of the present invention is to prevent any pipe blockage due to deposits of silicon compounds or the like, such as $SiO_2$, in a wet-process scrubber having the function to remove harm of acid gases such as hydrogen fluoride gas and chlorine gas. Namely, the present invention aims at simultaneous control of "harm removal" of hydrogen fluoride gas and chlorine gas and "deposition". Hereinafter, in the present invention, "harm removal" and "gas-liquid contact", which are attributable to the treating fluid, are interchangeably used. Also, "treating column" and "treating chamber" are interchangeably used.

Another object of the present invention is to provide a wet-process gas treatment method and a wet-process gas treatment apparatus, which enable continuous long-time operation and promise safety, preventing the above pipe blockage due to by-product deposits and preventing such deposits from forming on the back of spray nozzles.

To achieve the above objects, the present invention provides a wet-process gas treatment method, which is a method of treating an acid gas by means of at least two treating columns connected in series, wherein ratio of concentration Ce1 of acid gas at an outlet to concentration Ci1 of acid gas at an inlet, $R1=Ce1/Ci1$, of a first treating column into which the acid gas is first introduced is higher than ratio of concentration Cen of acid gas at an outlet to concentration Cin of acid gas at an inlet, $Rn=Cen/Cin$, of at least one of n-th treating columns ($n \geq 2$).

In the above wet-process gas treatment method, the ratio R1 may preferably be higher than all Rn's of the n-th treating columns ($n \geq 2$). Also, the ratio R1 may preferably be 0.4 or more.

The present invention also provides a wet-process gas treatment method, which is a method of treating an acid gas by means of at least two treating columns connected in series, wherein a mist flow, which is generated from an alkaline treating fluid sprayed from a spray nozzle installed inside a k-th treating column (k is a natural number) and flows on to a k-th+1 treating column, is kept alkaline in any space in pipes, which interconnect the treating columns.

The present invention still also provides a wet-process gas treatment method, which is a method of treating an acid gas by means of at least two treating columns connected in series, wherein flow rate of a spray, or concentration, of an alkaline treating fluid is so controlled that, with respect to the alkaline treating fluid sprayed into a first treating column, its pH value measured in a treating fluid tank provided at a lower part of the first treating column is 9 or more.

In these treatment methods, the treatment carried out in each treating column may preferably be the same.

The present invention further provides a wet-process gas treatment apparatus, which is an apparatus having at least two treating columns connected in series through connecting pipes, and treating an acid gas with an alkaline treating fluid, wherein a quantity of packings packed in a first treating column is smaller than a quantity of packings packed in any other treating column.

In this treatment apparatus, the quantity of packings packed in the first treating column may preferably be smaller than any of the quantity of packings packed in n-th treating columns ($n \geq 2$) (i.e., among quantities of packings packed in all treating columns, the quantity of packings packed in the first treating column is the smallest).

The present invention further provides a wet-process gas treatment apparatus, which is an apparatus having at least two treating columns connected in series through connecting pipes, and treating an acid gas with an alkaline treating fluid, wherein among the connecting pipes, at least a connecting pipe between a first treating column and a second treating column has spray nozzles to spray into the interior of the connecting pipe in a number of the number of bends plus 1 or more, and the spray nozzles are each so disposed that the alkaline treating fluid is directly sprayed thereon from other nozzle.

In the present invention described above, features may appropriately be combined as long as they are not contradictory to one another. Also, any treatment method making use of the above apparatus is also embraced in the present invention.

In the present invention described above, it is preferable to have at least three treating columns connected in series, in view of an improvement in throughput capacity.

DESCRIPTION OF THE PREFERRED EMBODIMENTS

Before the present invention is explained, the subject of the present invention is theoretically described with reference to the Reference Example.

REFERENCE EXAMPLE

Figure 3:
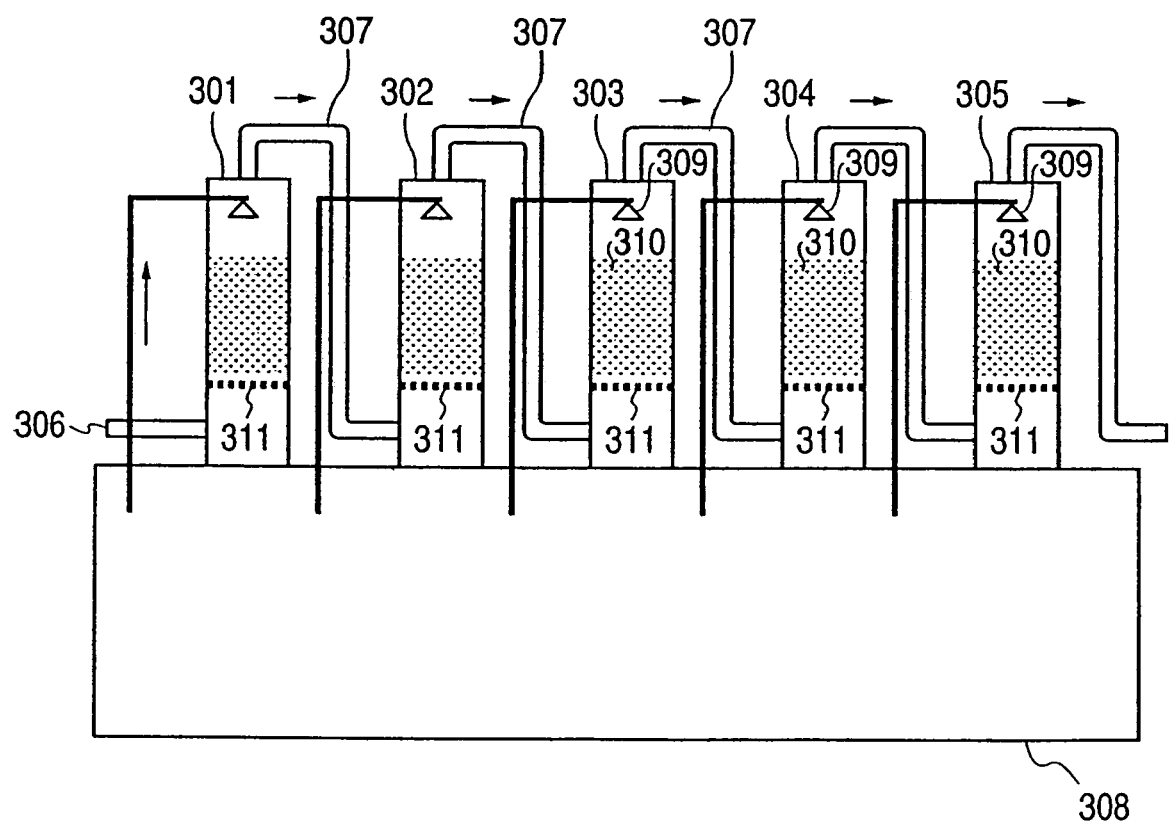
FIG. 3 illustrates a scrubber of Reference Example.

FIG. 3 shows a conventional waste gas treatment apparatus having five packed treating columns, which are disposed in series. In FIG. 3, reference numerals 301 to 305 denote a first packed column to a fifth packed column, in order; 306, an acid gas inlet; 307, connecting pipes; 308, a treating fluid tank; 309, spray nozzles; 310, packings; and 311, gratings.

A connecting pipe 307 extends from the ceiling of the first column 301 to the bottom of the second column 302 to connect both columns. The same applies to the second and the following columns. The fifth column 305 is connected to an exhaust blower (not shown) through its ceiling.

The flow of waste gas is formed by the suction of the exhaust blower, and the gas flows from the first column 301 toward the fifth column 305. A treating fluid is pumped up from the treating-fluid tank 308 by means of a corrosion-resistant pump (not shown), and is sprayed by the spray nozzles 309 each disposed close to the ceiling of each column. The fluid flows through the packings provided in each column to pass each grating 311 and returns to the treating-fluid tank 308.

The interior of each column and fans provided outside the column are the same as those described in connection with the related background art. Each of the five columns contains the same quantity of packings 310 having the same shape.

In this Reference Example, the treating fluid is an aqueous 25% NaOH solution, and acid gases are gases generated when polysilanes, which are by-products in a CVD system, are etched away with chlorine trifluoride (hereinafter simply $ClF_3$) gas. The polysilanes react with $ClF_3$ to becomes gaseous. Then, these gases undergo a hydrolysis reaction and are absorbed in the aqueous NaOH solution to become harmless. The reaction mechanism of the hydrolysis reaction is as described below.

$$nSiH_2Cl_2 + nH_2O \rightarrow (SiOH_2)_n + 2nHCl$$

$$3SiF_4 + H_2O \rightarrow 2H_2SiF_6 + SiO_2$$

$$SiF_4 + 2H_2O \rightarrow SiO_2 + 4HF.$$

A case in which $ClF_3$ diluted with nitrogen to 1% is made to flow in an amount of 1,000 liters per minute, namely, 10 liters/minute of $ClF_3$ and 990 liters/minute of nitrogen, are made to flow for 10 hours (600 minutes), that is to say, a case in which 6,000 liters of $ClF_3$ are made to flow so that a stated quantity of polysilanes can be cleaned off is described, for example. Assuming that in this case each column has a cross-sectional area of 1.5 m$^2$, the flow rate (volume velocity) of $ClF_3$ is 400 liters/hour-m$^2$. Where the apparatus continues to be operated at this gas flow rate, as in this Reference Example, the connecting pipe (inner diameter: 150 mm) between the first treating column and the second treating column has been found to become blocked completely with a deposit of $SiO_2$ in 3 hours.

The present inventors made sure of how the deposit formed. As the result, the following facts were found.

Little deposit was seen in the packings right beneath the spray nozzle in the first treating column, but a large amount of deposits was seen to have formed on the back side of the spray nozzle and in the above connecting pipe, which was on the downstream side of the flow of gas. Also, more than half of the cross-sectional area of the lowermost part of the packings and the grating was blocked. No blockage was seen in the second and the subsequent columns.

From the foregoing facts, the present inventors have obtained findings as shown below.

Finding 1

The treating-fluid aqueous NaOH solution is strongly alkaline, and, immediately after it has been sprayed from the spray nozzle, the mist of the treating fluid maintains the same pH as the treating fluid held in the treating-fluid tank. However, the pH is decreased as the mist comes into gas-liquid contact with the acid gas containing a large quantity of $ClF_3$ and the time of this gas-liquid contact is increased. Stated specifically, when the aqueous NaOH solution is sprayed from the spray nozzle, the flow of a mist formed by the exhaust fan is produced in addition to the conical shower (shower composed of the NaOH treating fluid). The shower flow is a counter flow with respect to the acid gas flow, whereas the mist flow is a parallel flow. Hence, the mist is kept in gas-liquid contact with the acid gas for a relatively long time. Also, the mist has a small particle diameter to have a large ratio of surface area to volume, and hence has a high contact efficiency. That is, the pH of the mist lowers gradually as it comes from the spray nozzle of the first treating column to the downstream side in the interior of the connecting pipe between the first treating column and the second treating column. When the mist becomes strongly acidic, a large quantity of the $SiO_2$ deposit forms in the pipe to cause the pipe to become blocked.

Finding 2

In the same interpretation, the blockage of the grating and its vicinity can also be explained. Namely, the alkaline treating fluid, having been sprayed from the spray nozzle of the first treating column, undergoes gas-liquid contact via the packings and the untreated acid gas having the highest concentration. At the part close to the ceiling of the first treating column at the upper part of the packings, the alkaline treating fluid is close to the spray nozzle. Hence, the time for which the alkaline treating fluid is sprayed, thereafter undergoing gas-liquid contact with the acid gas and reaching the upper part of the packings, is so short that it remains alkaline. On the other hand, it is distant from the spray nozzle at the part coming into contact with the grating at the lower part of the packings. Hence, the time for which it is sprayed and thereafter, undergoing gas-liquid contact with the acid gas, reaches the lower part of the packings, is so long that the alkaline treating fluid turns acidic. Then, when the mist becomes strongly acidic, $SiO_2$ is abruptly deposited.

Finding 3

When the acid gas is treated in a large quantity, making the throughput in the first treating column larger than is necessary results in promotion of the clogging of the packings and the blockage of the pipe with the lapse of treatment time.

Use a large quantity of the packings enlarges the area of contact between the acid gas and the alkaline treating fluid (enlarges the reacting weight) on the one hand, but on the other hand, provides a resistance with respect to the flow of the alkaline treating fluid. Hence, in an atmosphere where a large amount of the acid gas is present, the pH becomes small before the alkaline treating fluid reaches the lower part of the packings, so that the throughput capacity is decreased and the deposit begins to form. As the result, the packings clog and further obstruct the flow of the alkaline treating fluid, leading to the blockage of the pipe.

Even if as a countermeasure the flow rate of the alkaline treating fluid is merely increased, the quantity of the alkaline treating fluid that can flow through fine openings of the packings per unit time is constant, and hence the treating fluid cannot flow into the openings of the packings to overflow the treating column.

That is to say, the throughput of the acid gas in the first treating column must be controlled to an optimum range.

Embodiments of the present invention are described below.

A first preferred embodiment of the present invention is described first.

As stated above, in order to keep $SiO_2$ from depositing, the treating fluid is made so as to become alkaline (pH>7). In order to prevent the treating fluid from undergoing oxidation due to the acid gas in the first treating column, the gas-liquid contact must be controlled to make sufficient the flow rate of a shower and concentration of the treating fluid with respect to the flow rate of the acid gas introduced. With regard to the flow rate, it is described in Example 1. How to keep the gas-liquid contact from taking place is described below with reference to the concentration of the acid gas.

Table 1 shows the concentration of acid gas at the inlet of each treating column and the concentration of acid gas at its outlet in the case of the Reference Example and those in the case of the present invention (the present embodiment). For simplification, the term "first treating column" is often shortened to, e.g., the "first column". Also, in Table 1, the fourth-column inlet and the fifth-column inlet are omitted, because they are equal to the third-column outlet and the fourth-column outlet, respectively.

Table 2 shows the ratio of concentration of acid gas Cek at the outlet to concentration of acid gas Cik at the inlet, Rk=Cek/Cik, of a k-th treating column (k is a natural number). The smaller the numerical value of Rk, the more abruptly the reaction takes place in the interior of the treating column.

In the case of the gas treatment apparatus of the Reference Example, the concentration of the acid gas decreases according to a geometric progression. In the present invention, the concentration decreases slowly compared with that in the Reference Example, and decreases abruptly at the fifth column.

TABLE 1

Measurements (ppm) of concentration of acid gas in each column at the time the acid gas enters the first column at 10,000 ppm

|  | First column inlet | First column outlet | Second column inlet | Second column outlet | Third column outlet | Fourth column outlet | Fifth column outlet |
| --- | --- | --- | --- | --- | --- | --- | --- |
| Reference Example | 10,000 | 1,100 | 1,200 | 130 | 15 | 2 | 0.2 |
| Present Invention | 10,000 | 4,000 | 2,400 | 700 | 72 | 5 | 0.2 |

TABLE 2

Ratio Rk of concentration of acid gas at outlet to concentration of acid gas at inlet of each column

|  | First column | Second column | Third column | Fourth column | Fifth column |
| --- | --- | --- | --- | --- | --- |
| Reference Example | 0.11 | 0.11 | 0.12 | 0.13 | 0.10 |
| Present Invention | 0.40 | 0.29 | 0.10 | 0.07 | 0.02 |

The reason why in "Present Invention" in Table 1 the concentration of acid gas at the first-column outlet differs from the concentration of acid gas at the second-column inlet is that spray nozzles for feeding alkaline showers are installed in the interior of the connecting pipe between the first treating column and the second treating column.

As can be seen from Table 2, the concentration ratio R1 is 0.4 in "Present Invention", where blockage did not occur, whereas in the Reference Example the concentration ratio R1 is 0.11, where the blockage occurred. Thus, blockage does not occur as long as this concentration ratio R1 is at least 0.4 or above.

In the Reference Example, there is also the fact that blockage does not occur after the second treating column inlet at which the concentration of acid gas is 1,200 ppm. From this fact, since the acid gas concentration is 700 ppm at the third treating column inlet in "Present Invention", it is judged to be unnecessary to install any spray nozzle in the interiors of the connecting pipes of the third and the following columns.

The pH value may also preferably be controlled to be 7 or more, so that the deposition reaction can be kept from occurring in all the treating columns. How to control the pH value is described below classifying the matter into (1) and (2) with regard to the number of the treating-fluid tank.

Figure 1:
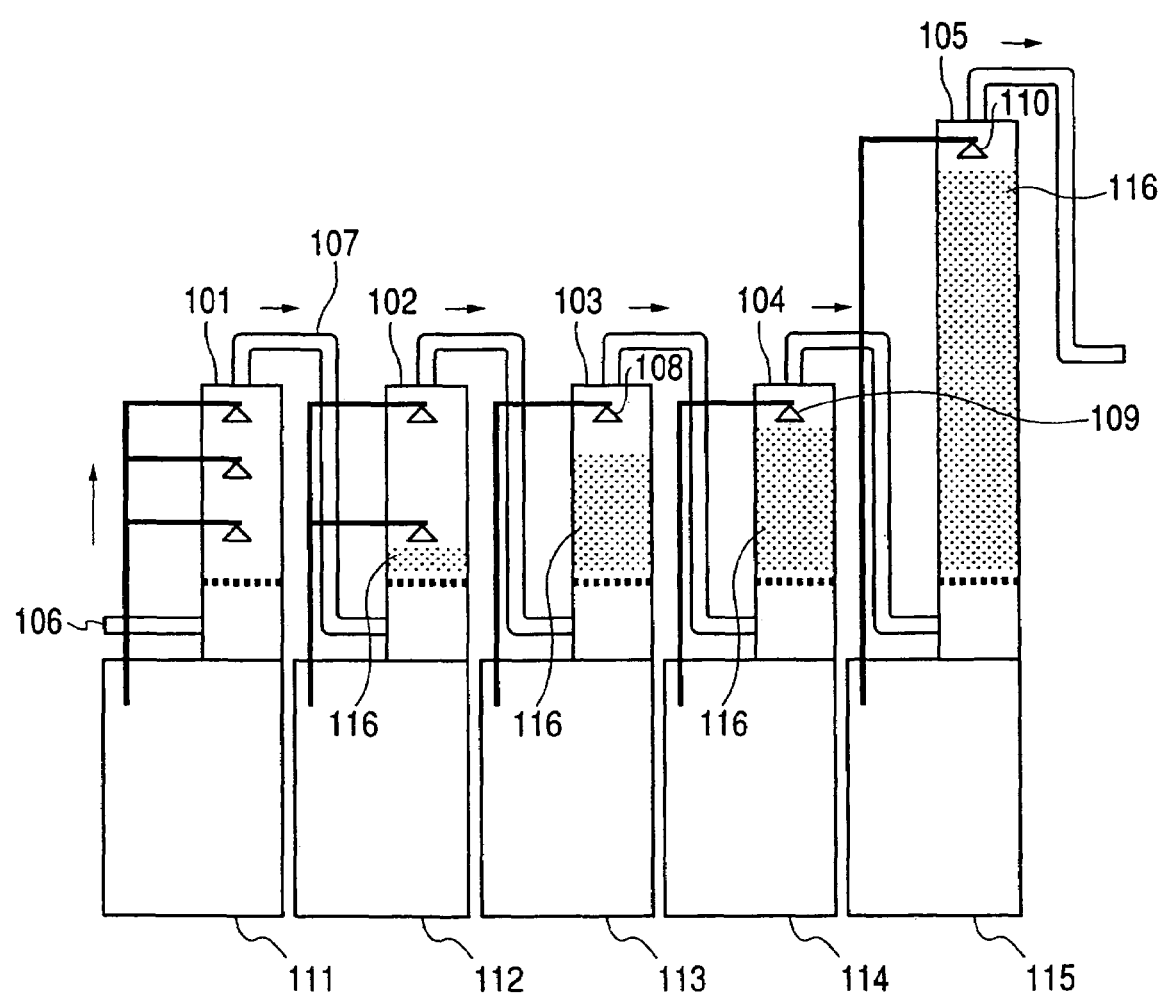
FIG. 1 illustrates Example 1 of the present invention.

A case in which the treating-fluid tank is independently provided for each treating column (see FIG. 1).

(2) A case in which only one treating-fluid tank is provided in common to all the treating columns (see FIG. 3).

The pH value control in the case (1) is described.

Treating-fluid tanks 111 to 115 shown in FIG. 1 are each provided with a pH meter and an NaOH treating fluid feed pump (both not shown). The pH is controlled by feeding an NaOH treating fluid from the outside via the NaOH feed pump, so that the treating fluid can be kept alkaline for each column in accordance with the concentration of the acid gas in each treating column.

The pH value control in the case (2) is described.

In this case, since the pH value of the above treating fluid cannot be controlled column by column, it is adjusted by the quantity of packings. In Reference Example, in which the packings are put in each column in an equal quantity, the concentration of the acid gas decreases according to a geometric progression in the first treating column. In the first treating column in which the concentration of the acid gas is 10,000 ppm, the NaOH treating fluid turns acidic, and $SiO_2$ tends to deposit. Accordingly, the present inventors consider that $SiO_2$ is not deposited as long as the concentration of the acid gas changes slowly to convert the NaOH treating fluid into an acid.

This can be explained in detail as follows:

In order to control the deposition in the first treating column having a high concentration of the acid gas, the flow rate of the alkaline treating fluid is made sufficiently higher than the quantity in which the reaction of neutralization with the acid gas takes place. Where the alkaline treating fluid is at a high flow rate in the first treating column, it is desirable to incorporate a spray column (in which the quantity of packings is zero or smaller than the packings of any one column of other treating columns) in the structure. The reaction of neutralization takes place even in this spray column, but its reacting weight is not anything like that of the packed column. Hence, the ratio of concentration of the acid gas between the inlet and outlet of the treating column is larger in the spray column than in the treating column of the Reference Example. Namely, the reaction is restrained. In the second treating column, the flow rate of the alkaline treating fluid is set higher than that in "Reference Example", and at the same time the quantity of packings is set to be smaller than that of packings per column in the Reference Example (see Table 4). In the third and the following treating columns, the packings are placed to compensate the quantity smaller than the packings per column in the Reference Example in the first treating column and second treating column. Here, the height and inner diameter of the treating column are appropriately designed so that the pressure loss does not become larger than the preset value.

As described above, in the present invention, the same treatment is carried out in all the treating column, and in the first treating column a certain quantity of the acid gas has been treated. Hence, even when the packings are used in a larger quantity in the second and the following treating columns than in the first treating column, the treatment can efficiently be carried out without clogging the packings and any blocking the pipes.

In order to avoid the blockage of the interiors of the connecting pipes, as can be seen from Finding 1, the mist flow is kept alkaline in the space in the connecting pipe between the first treating column and the second treating column. Specific system construction therefore is described later.

In the present invention, it is also preferable that the treatment in each treating column is the same (at least involves the same treatment). Herein, what is mean by "the treatment is the same" is that the chemical reaction the gas to be treated undergoes is the same. With such a construction, the total throughput can be optimally distributed to the respective treating columns to efficiently carry out the treatment.

In the first preferred embodiment of the present invention, the spray column in which the quantity of packings is zero in the first treating column has been exemplified as a typical case. The quantity of packings need not be zero as long as the pH of the treating fluid is 7 or more at the lower part of the column (a second preferred embodiment). More specifically, as shown in Table 2, it may suffice as long as the ratio of concentration of the acid gas between the inlet and outlet of the first treating column is higher than the ratio of concentration in any other treating column. To describe this in terms of the quantity of packings, this quantity in the first treating column is smaller than the quantity in any one of the second and the following columns.

As is evident from Finding 2, in order to avoid the blockage of the interior of the first treating column, the treating fluid may preferably be controlled so that it does not become acidic in the interior of this column. Then, the flow rate of a spray, or the pH ($H^+$ or $OH^-$ concentration), of the alkaline treating fluid may preferably be controlled, so that the alkaline treating fluid, having been sprayed from the upper part of the first treating column, has a pH of 9 or more in the treating-fluid tank provided at the lower part of that column. With regard to the flow rate and the pH ($H^+$ or $OH^-$ concentration), these are described in Example 1.

With regard to the fact that the mist, which causes blockage of connecting pipes, as described previously, turns acidic, it is preferable that more spray nozzles for feeding the showers of the alkaline treating fluid are provided to spray into the interior of each connecting pipe, so that the mist can be kept alkaline. As the number of such spray nozzles, a spray nozzle is provided for each bend of the connecting pipe, and the spray nozzles may preferably be disposed, so that one spray nozzle sprays the alkaline treating fluid directly to other nozzle adjacent thereto, so that any deposit may not form on the back of the nozzle. The number of spray nozzles necessary for spraying all of the backs of nozzles to spray into the interior of each connecting pipe is one plus the number of bends of the connecting pipe. With regard to the spray nozzles, they are further described in Example 1.

The present invention is described below in greater detail by the following Example.

Example 1

A wet-process scrubber (gas treatment apparatus) of this Example is the same as the apparatus of the Reference Example with respect to the number of columns (five-column type), the total amount of packings, the manner of connecting pipes and the position of fans. This Example is different from the Reference Example in the number and position of spray nozzles, the percentage of distribution of packings to columns, the height of the fifth column, and that the treating-fluid tank is divided into five tanks. Its conceptional view is shown as FIG. 1. FIG. 1 is drawn in conformity with the distribution percentage of packings as shown later (Table 4).

In FIG. 1, reference numerals 101 to 105 denote a first treating column to a fifth treating column in order; 106, an acid gas inlet; 107, connecting pipes; 108 to 110, spray nozzles; 111 to 115, treating fluid tanks; and 116, packings.

Figure 2:
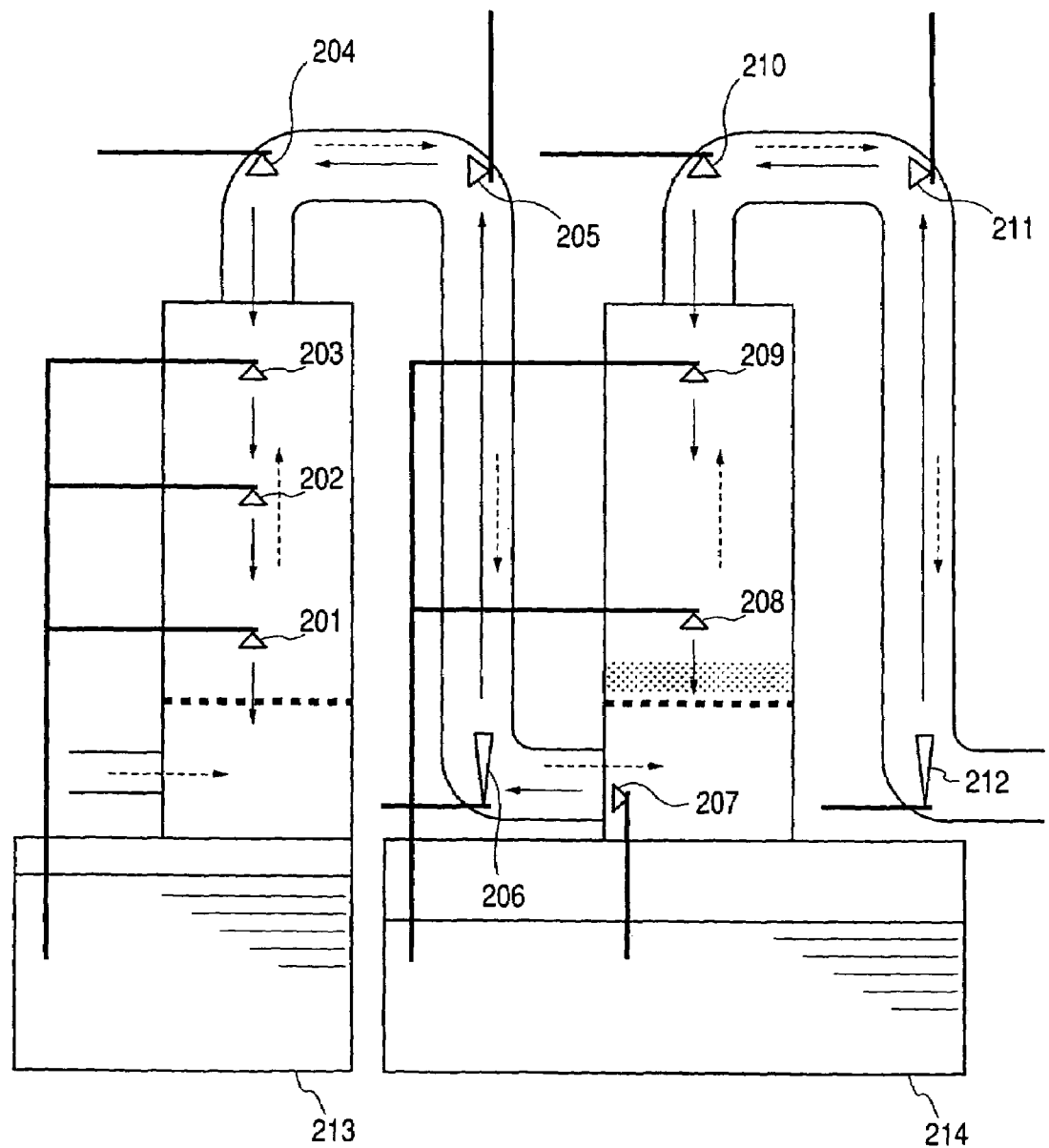
FIG. 2 is a partially enlarged view of the first treating column and second treating column shown in FIG. 1.

FIG. 2 is a partially enlarged view of the first treating column and the second treating column shown in FIG. 1. In FIG. 2, reference numerals 201 to 212 denote spray nozzles; and 213 and 214, treating-fluid tanks. Also, the flows of the acid gas are shown by dotted-line arrows, and the shower flows by solid-line arrows. A description with regard to (1) the shower and (2) the quantity of packings in each column follows this paragraph.

(1) Description with regard to the shower:

The shower is fed from each spray nozzle.

The spray nozzle 204 is provided above the spray nozzle 203 and also at the upper end portion of the connecting pipe, so that the back of the spray nozzle 203 can be sprayed with the treating fluid (shower). Also, the spray nozzle 205 is installed only in the lateral direction, so that the treating fluid can be sprayed on the non-spray portion of the spray nozzle 204. That is, the spray nozzles are installed so that the treating fluid is sprayed on a preceding nozzle. For example, in the case when as shown in FIG. 2 the connecting pipe extending from the first column to the second column has three bends and four straight-pipe portions, four spray nozzles may further be installed. As the result, the mist flow on the backs of the nozzles and in the interiors of the connecting pipes can be kept alkaline (pH>7) and $SiO_2$ can be prevented from depositing.

Stated specifically, in the case mentioned previously in which the mass velocity of $ClF_3$ is 400 liters/hour·m², the concentration of the treating fluid held in the treating-fluid tanks 111 to 115 was measured with a pH meter, and the treating fluid was so fed as to have a pH=10. Under such conditions, the flow rates of the NaOH treating fluid sprayed from the above spray nozzles were as shown in Table 3 below. Here, the pH of the NaOH treating fluid held in the treating-fluid tanks 111 and 112, i.e., the treating-fluid tanks 213 and 214, was actually controlled to be in range from 9.4 to 11.6. Also, any blockage due to $SiO_2$ deposition was not seen in the period of observation for 3 months. The same results as in the case of pH=10 were obtained in the cases of pH=9. Accordingly, in order to keep $SiO_2$ from depositing, the pH may be 9 or more (9, or more alkaline side than 9) in the treating-fluid tanks.

TABLE 3

Flow rates of NaOH treating fluid from spray nozzles Unit: liter/minute

| Ref. num. | Flow rate |
| --- | --- |
| 201 | 30 |
| 202 | 30 |
| 203 | 30 |
| 204 | 10 |
| 205 | 10 |
| 206 | 10 |
| 207 | 10 |
| 208 | 40 |
| 209 | 40 |
| 210 | 10 |
| 211 | 10 |
| 212 | 10 |
| 108 | 60 |
| 109 | 60 |
| 110 | 60 |
| — | — |

In general, $SiO_2$ particles are considered to have a tendency to agglomerate when an aqueous solution becomes strongly acidic, and hence they may agglomerate with difficulty when the pH is 9 or more. Also, since the spray nozzles are further installed to spray into the interior of each connecting pipe, the gas-liquid contact is promoted in this space, and the deposition is restrained.

In the foregoing, the matter has been explained about the agglomeration of $SiO_2$ particles. Other inorganic oxide particles, too, may change to become easily deposited with changes in pH of solutions. Accordingly, the above method can be applied to particles that are easily deposited in an acidic solution.

(2) Description with regard to the quantity of packings (distribution percentage) in each column:

When the same quantity of packings are put in all packed columns as in the case of the Reference Example, the deposition of $SiO_2$ takes place intensively in the first column. Accordingly, in the wet-process scrubber, which involves deposition, dispersing the deposited substance in the alkaline treating fluid leads to prolonging the useful life of the apparatus. The pH for each treating column is preset at 7 or more. Then, the treating fluid is controlled, so that this preset value can be maintained. Also, since the NaOH treating fluid necessary for neutralization differs in quantity for each column, the treating-fluid tank is divided into tanks 111 to 115 as shown in FIG. 1. In particular, since the acid gas with a high concentration comes in the first column, the NaOH treating fluid held in the treating-fluid tank 111 for the first column is more frequently exchanged or replenished than those in other treating columns.

In the case in which the mass velocity of $ClF_3$ is 400 liters/hour·m², the distribution percentage of packings is as shown in Table 4 below. In Table 4, it is shown together with that of the Reference Example.

TABLE 4

| | Distribution percentage of packings (%) | | | | | |
|---|---|---|---|---|---|---|
| | First column | Second column | Third column | Fourth column | Fifth column | Total |
| Example 1 | 0 | 7 | 20 | 28 | 45 | 100 |
| Reference Example | 20 | 20 | 20 | 20 | 20 | 100 |

The scrubber (gas treatment apparatus) in which the method of this Example has been applied under such distribution percentage of packings and using more spray nozzles installed as described above was intermittently operated for 200 hours, and thereafter stopped to observe the interior of the scrubber. As the result, a very small quantity of deposits was seen at the bends of the connecting pipes, but the connecting pipes were not blocked. A deposit was also seen at a part of the grating of the first column, but the quantity of the deposit was so small that it could be easily removed.

According to the above Example, a plurality of spray nozzles are used at several locations to maintain the mist of the treating fluid inside the treating columns alkaline. Thus, the deposition on the connecting pipes and so forth can be kept from taking place to prevent the blockage from occurring. Especially when the target pH is 10, actual measured values are 9.4 to 11.6. Even after operating for 3 months, only a very slight deposition is observed in the interior of the first treating column and in the connecting pipe between the first treating column and the second treating column, and no blockage was observed.

What is claimed is:

1. A wet-process gas treatment apparatus comprising at least two treating columns connected in series through connecting pipes, which said apparatus treats an acid gas with an alkaline treating fluid, wherein a quantity of packings packed in a first treating column is smaller than a quantity of packings packed in any other treating column of second and following treating columns.

2. The wet-process gas treatment apparatus according to claim 1, wherein the quantity of packings packed in the first treating column is smaller than any of the quantity of packings packed in n-th treating columns (n≧2).

* * * * *

UNITED STATES PATENT AND TRADEMARK OFFICE
CERTIFICATE OF CORRECTION

| | |
|---|---|
| PATENT NO. | : 7,288,140 B2 |
| APPLICATION NO. | : 10/959966 |
| DATED | : October 30, 2007 |
| INVENTOR(S) | : Hiroshi Echizen et al. |

It is certified that error appears in the above-identified patent and that said Letters Patent is hereby corrected as shown below:

ON TITLE PAGE AT (56) OTHER PUBLICATIONS

After ""Theory and Calculations ... by Saburo": "Kamel," should read --Kamei,--.

COLUMN 2

Line 25, "Jet" should read --jet--.

COLUMN 5

Line 5, "becomes" should read --become--;
Line 24, "liters/hour-m,$^2$." should read --liters/hour•m$^2$.--; and
Line 62, "lowers" should read --decreases--.

COLUMN 6

Line 27, "Use" should read --Use of--.

COLUMN 8

Line 45, "compensate" should read --compensate for--;
Line 52, "column," should read --columns,--;
Line 58, "any blocking" should read --blocking any of--;
Line 66, "is" should read --be--; and
Line 67, "involves" should read --involve--.

UNITED STATES PATENT AND TRADEMARK OFFICE
CERTIFICATE OF CORRECTION

| | |
|---|---|
| PATENT NO. | : 7,288,140 B2 |
| APPLICATION NO. | : 10/959966 |
| DATED | : October 30, 2007 |
| INVENTOR(S) | : Hiroshi Echizen et al. |

It is certified that error appears in the above-identified patent and that said Letters Patent is hereby corrected as shown below:

<u>COLUMN 9</u>

Line 33, "are" should read --be--.

Signed and Sealed this

First Day of July, 2008

JON W. DUDAS
*Director of the United States Patent and Trademark Office*